United States Patent [19]

Choi

[11] Patent Number: 5,982,575
[45] Date of Patent: Nov. 9, 1999

[54] TAPE LOADING APPARATUS WITH A PAIR OF LINK DEVICES HAVING DEFORMABLE BENT PORTIONS

[75] Inventor: Jae-Kyu Choi, Seoul, Rep. of Korea

[73] Assignee: Daewood Electronics Co. Ltd., Seoul, Rep. of Korea

[21] Appl. No.: 08/977,688

[22] Filed: Nov. 24, 1997

[30] Foreign Application Priority Data

Dec. 30, 1996 [KR] Rep. of Korea ............... 96-78357
Dec. 30, 1996 [KR] Rep. of Korea ............... 96-78367

[51] Int. Cl.$^6$ ............... G11B 5/027; G11B 5/008
[52] U.S. Cl. ............................ 360/85; 360/95
[58] Field of Search ..................... 360/85, 95

[56] References Cited

U.S. PATENT DOCUMENTS 4,459,625  7/1984  Kawase .
4,556,922  12/1985  Erhart .
5,475,546  12/1995  Choi et al. .
5,597,130  1/1997  Chiu et al. .

FOREIGN PATENT DOCUMENTS 0702362  2/1997  European Pat. Off. .
1506617  4/1978  United Kingdom .

*Primary Examiner*—A. J. Heinz
*Attorney, Agent, or Firm*—Pennie & Edmonds LLP

[57] ABSTRACT

A video cassette recorder includes a driving unit, a pair of pole base assemblies and power conveying unit for conveying a power from the driving unit to the pole base assemblies, the power conveying unit having a pair of link devices for transmitting a power from the driving unit into its corresponding pole base assembly and allowing the pole base assemblies to load a tape. Each of the link devices has a deformable bent portion for exerting a resilient force on the loaded tape.

1 Claim, 6 Drawing Sheets

TAPE LOADING APPARATUS WITH A PAIR OF LINK DEVICES HAVING DEFORMABLE BENT PORTIONS

FIELD OF THE INVENTION

The present invention relates to a video cassette recorder ("VCR"); and, more particularly, to a tape loading apparatus for use in the VCR, the apparatus incorporating therein a link device capable of exerting a resilient force on a loaded tape.

BACKGROUND OF THE INVENTION

In general, a magnetic recording and/or reproducing apparatus having a rotary type head drum such as a VCR is provided with a tape loading apparatus. The tape loading apparatus is designed to draw a portion of a magnetic tape out of a cassette loaded in the VCR and to run same in a predetermined path by moving pole base assemblies, which are respectively provided on a supply reel side and a take-up reel side so as to move along a curvilinear loading slot formed at a deck. While running through the predetermined path, the tape makes contact with a peripheral surface of the head drum, which is provided with at least one or more heads so as to record/reproduce signals onto/from the tape.

One of the prior art tape loading apparatuses is shown in FIG. 1. In the illustrated apparatus, the tape loading apparatus includes a motor 11 for loading a tape cassette 1 and a tape (not shown), a pair of pole base assemblies 12 which are, respectively, moved along a pair of loading slots 3 formed on a deck 2, for extracting the tape from the loaded tape cassette 1 and bringing it into contact with a head drum 4 of VCR, and a power conveying unit for transmitting a power from the motor 11 into the pole base assemblies 12. The power conveying unit includes a cam gear 21 driven by the motor 11 and having a cam groove 22, a relay arm 23 connected with the cam gear 21 by engaging one end thereof with the cam groove 22 and having a gear portion 24 at the other end thereof, a relay gear 25 connected with the relay arm 23 by engaging with the relay arm gear portion 24, a sliding plate 26 having a first gear portion 27 engaged with the relay gear 25 and a second gear portion 28, a pole base assembly driving gear 29 connected with the sliding plate 26 by an engagement with the second gear portion 28 of the sliding plate 26, and a pair of pole base assembly loading gears 30. The loading gears 30 are engaged with each other and one thereof is engaged with the driving gear 29. Further, each of the loading gears 30 is connected with its corresponding pole base assembly 12 via a link device 31.

The tape loading apparatus further includes a springs 32 (only one shown) which is interposed in each of the pole base assembly loading gears 30 so as to be biased toward the link device 31.

A tape is loaded by first actuating the motor 11. The power of the motor 11 is transmitted into one of the pole base assembly loading gears 30 via the relay arm 23, the relay gear 25, the sliding plate 26 and the pole base assembly driving gear 29, which, in turn, rotates the other pole base assembly loading gear 30. The rotation of the pole base assembly loading gears 30 allows the pole base assemblies 12 to extract the tape from the loaded tape cassette 1 and to bring it contact with the head drum 4 through the link devices 31. The spring 32 urges the link device 31 toward the loaded tape, thereby preventing the loaded tape from slackening.

One of the major shortcomings of the tape loading apparatus described above is that it is tricky and cumbersome to engage the spring between the pole base assembly loading gear and its corresponding link device, thereby making the assembly thereof difficult.

SUMMARY OF THE INVENTION

It is, therefore, a primary object of the invention to provide a link device to be incorporated in a tape loading apparatus for use in VCR, the link device capable of exerting a resilient force on a loaded tape.

In accordance with one aspect of the present invention, there is provided a video cassette recorder provided with a driving unit, a pair of pole base assemblies and power conveying unit for conveying a power from the driving unit to the pole base assemblies, the power conveying unit comprising: a pair of link devices for transmitting a power from the driving unit into its corresponding pole base assembly and allowing the pole base assemblies to load a tape, wherein each of the link devices has a deformable bent portion serving as a resilient means for exerting a resilient force on the tape even after a tape loading operation is completed.

In accordance with another aspect of the present invention, there is provided a video cassette recorder comprising: a deck provided with a driving unit and a head drum; a pair of pole base assemblies for extracting a tape out of a tape cassette loaded into the deck and loading the tape toward the head drum, each pole base assembly having a pin; a power conveying unit for conveying a power from the driving unit to the pole base assemblies, wherein the power conveying unit includes a pair of link devices for transmitting a power from the driving unit into its corresponding pole base assembly, each of link devices having an elongated hole for accommodating the pin of the pole base assembly; and a resilient member provided at one end of each link device in such a way that, even after a tape loading operation is completed, it exerts a resilient force on the pin inserted into the elongated hole of the link device, the resilient member extending across the elongated hole of the link device and supporting the pin inserted into the elongated hole.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
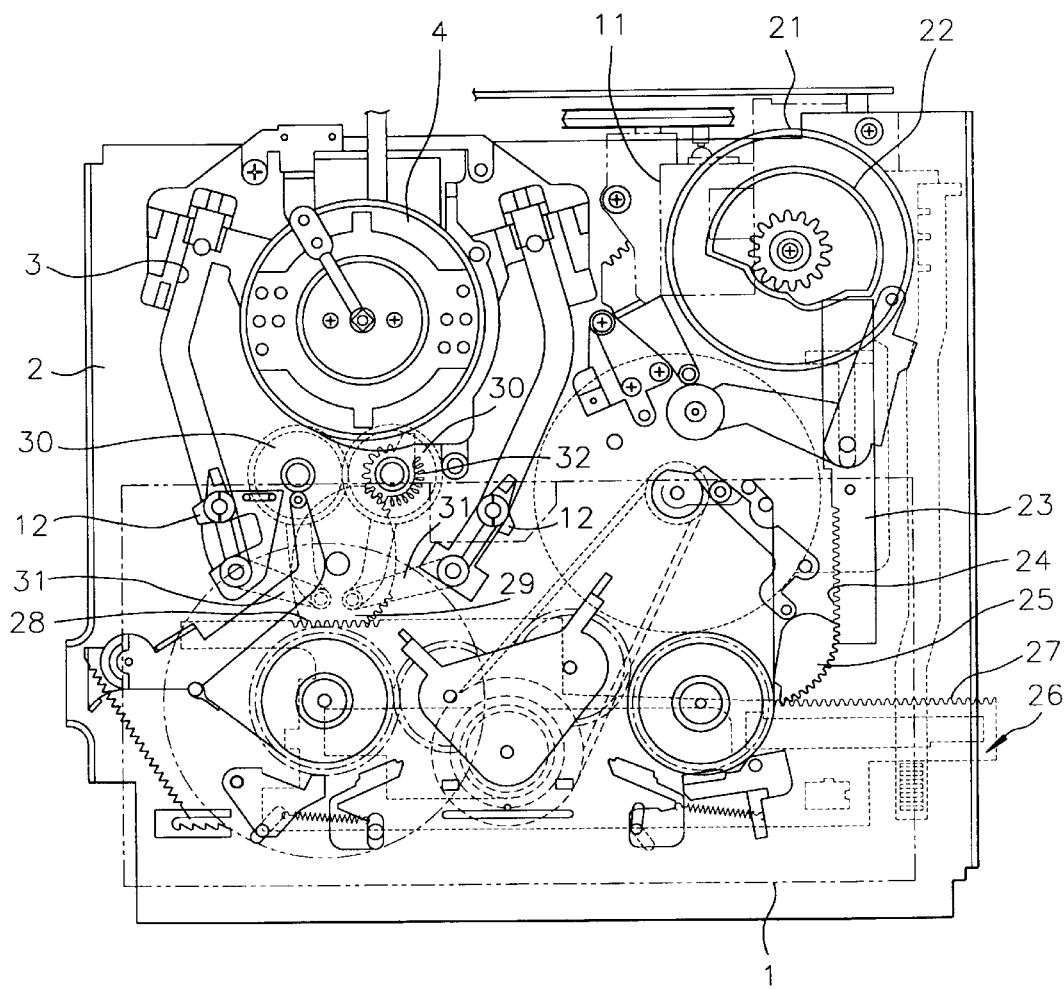
FIG. 1 shows a schematic top view illustrating the conventional tape loading apparatus.

A tape loading apparatus in accordance with a first preferred embodiment of the present invention will be described using FIGS. 2 to 5.

The inventive tape loading apparatus includes a motor 51 for loading a tape cassette 41 and a tape (not shown), a pair of pole base assemblies 52 which are, respectively, moved along a pair of loading slots 43 formed on a deck 42, for extracting the tape from the loaded tape cassette 41 and bringing it into contact with a head drum 44 of VCR, and a power conveying unit for transmitting a power from the motor 51 into the pole base assemblies 52.

The power conveying unit includes a cam gear 61 driven by the motor 51 and having a cam groove 62, a relay arm 63 one end of which is engaged with the cam groove 62 and the other end of which is formed with a gear portion 64, a relay gear 65 engaged with the relay arm gear portion 64, a sliding plate 66 having a first gear portion 67 engaged with the relay gear 65 and a second gear portion 68, a pole base assembly driving gear 69 engaged with the second gear portion 68 of the sliding plate 66, and a pair of pole base assembly loading gears 70. One of the loading gears 70 is always engaged with the pole base assembly driving gear 69 and both are engaged with each other, allowing the pole base assembly driving gear 69 to rotate each of the pole base assembly loading gears 70, simultaneously.

Figure 2:
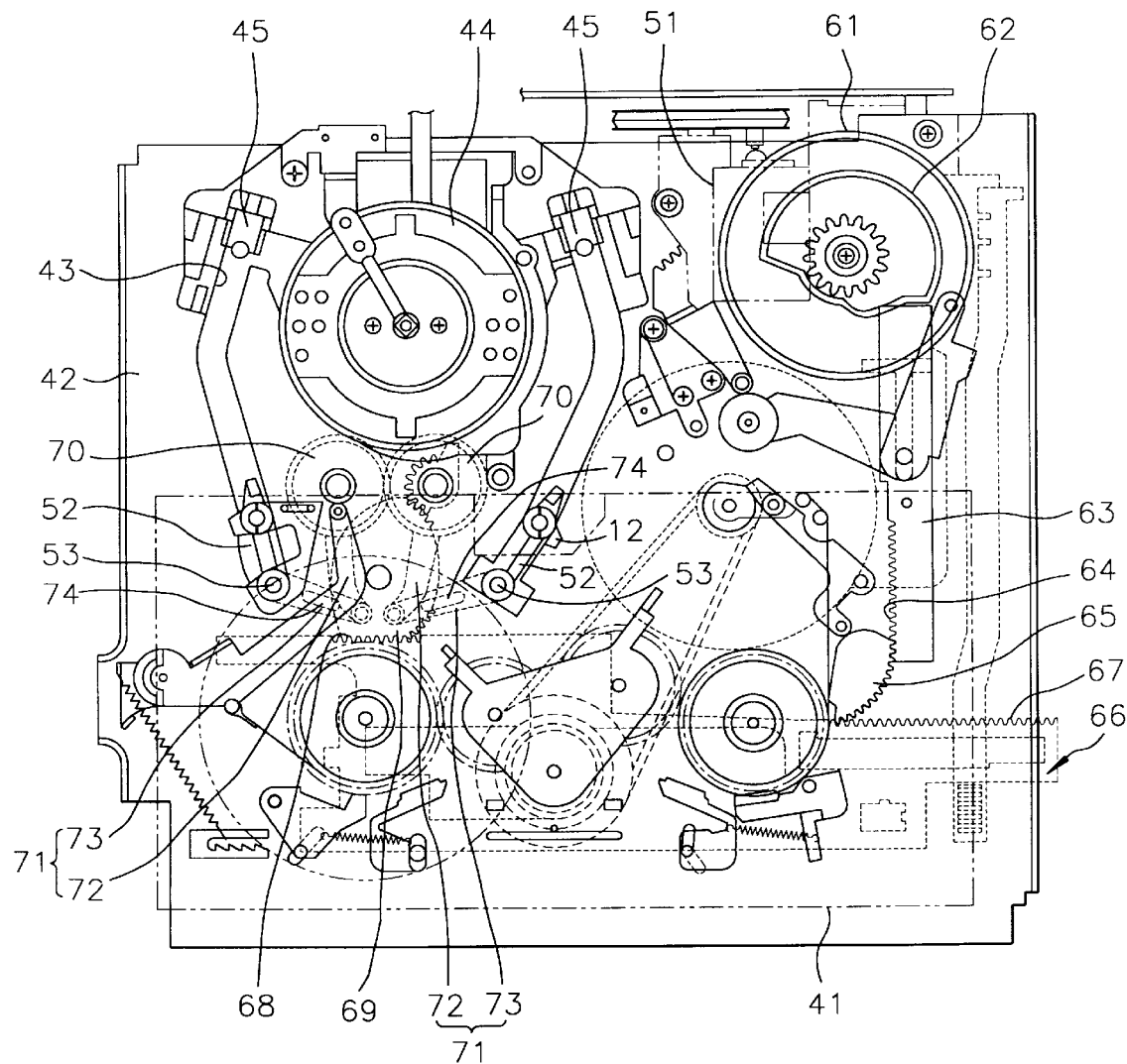
FIG. 2 presents a schematic top view illustrating a tape loading apparatus in accordance with the first preferred embodiment of the present invention.

The power conveying unit, further, includes a pair of link devices 71 for allowing the pole base assemblies 52 to move along the loading slots 43 and for exerting an appropriate resilient force on the loaded tape, even after a tape loading operation is completed. As shown in FIG. 2, the construction of link devices 71 is substantially identical and accordingly only one will be described in detail.

Figure 3:
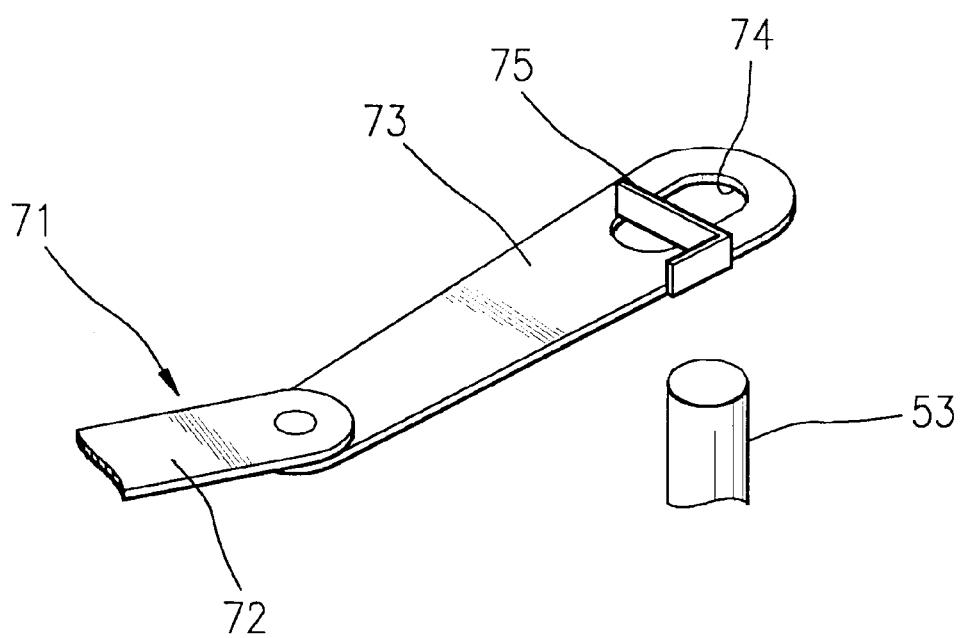
FIG. 3 represents a view setting forth an arrangement between a link device and a pole base assembly in accordance with the first preferred embodiment of the present invention.

The link device 71 has a first link 72 and a second link 73. The first link 72 is fixedly connected with the pole base assembly loading gear 70 at one end thereof, and the second link 73 is rotatably connected with the other end of the first link 72 at one end thereof. Further, as shown in FIG. 3, the second link 73 has at its the other end an elongated hole 74 and is provided with an L-shaped resilient piece 75 extending across the elongated hole 74, and each of the pole base assemblies 52 has a pin 53 for engaging with the second link 73. The link device 71 is engaged with the pole base assembly 52 by inserting the pin 53 into the elongated hole 74 in such a way that the pin 53 is supported by the resilient piece 75.

Figure 4:
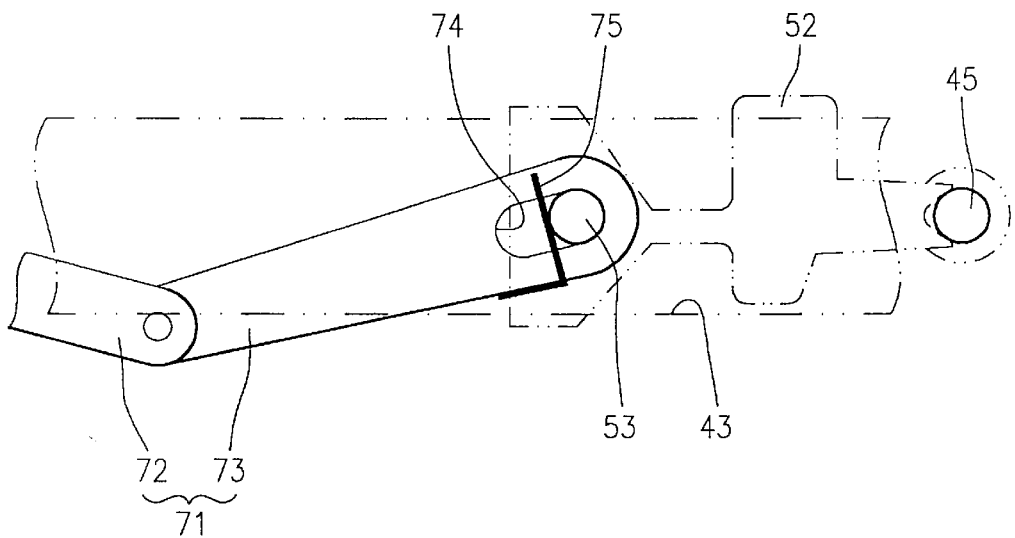
FIG. 4 illustrates a bottom view showing a tape loading process in accordance with the first preferred embodiment of the present invention.
Figure 5:
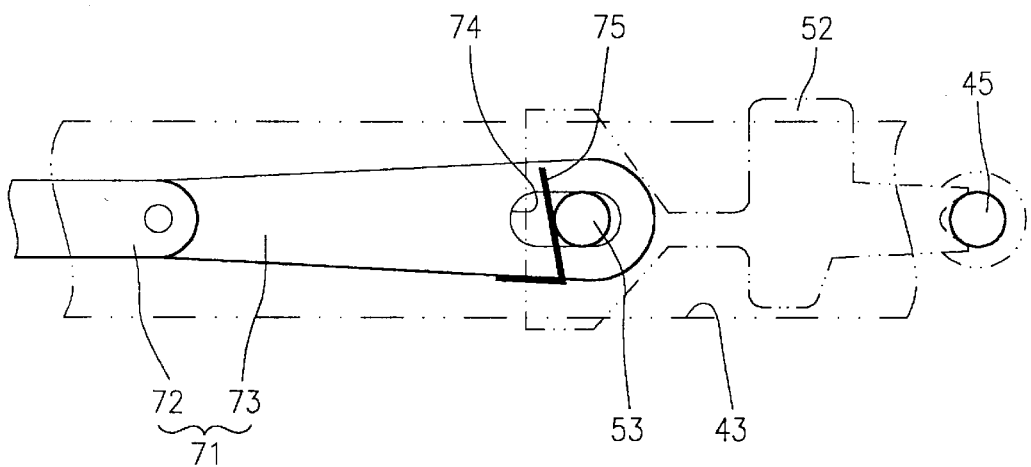
FIG. 5 describes a bottom view showing how the link device exerts a resilient force on a loaded tape according to the first preferred embodiment of the present invention.

A tape is loaded by first actuating the motor 51. The power of the motor 51 is then transmitted into one of the pole base assembly loading gears 70 via the relay arm 63, the relay gear 65, the sliding plate 66 and the pole base assembly driving gear 69, which, in turn, rotates the other pole base assembly loading gear 70. As shown in FIG. 4, the rotation of the pole base assembly loading gears 70 permits the link device 71 to move the pole base assembly 52 along its corresponding loading slot 43, till the pole base assembly 52 comes into contact with a positioning block 45 formed at the deck 42. As shown in FIG. 5, when the pole base assembly loading gears 70 are further rotated and the pin 53 is moved along the elongated hole 74 of the second link 73 in the left direction, the resilient piece 75 is elastically deformed, making it possible for the resilient piece 75 to exert the resilient force on the loaded tape, thereby preventing the tape from slackening.

A link device (only one shown) in accordance with a second preferred embodiment of the present invention will now be described with reference to FIGS. 2 and 6–8. It should be noted that like parts appearing in FIGS. 2 and 6–8 are represented by like reference numerals.

Figure 6:
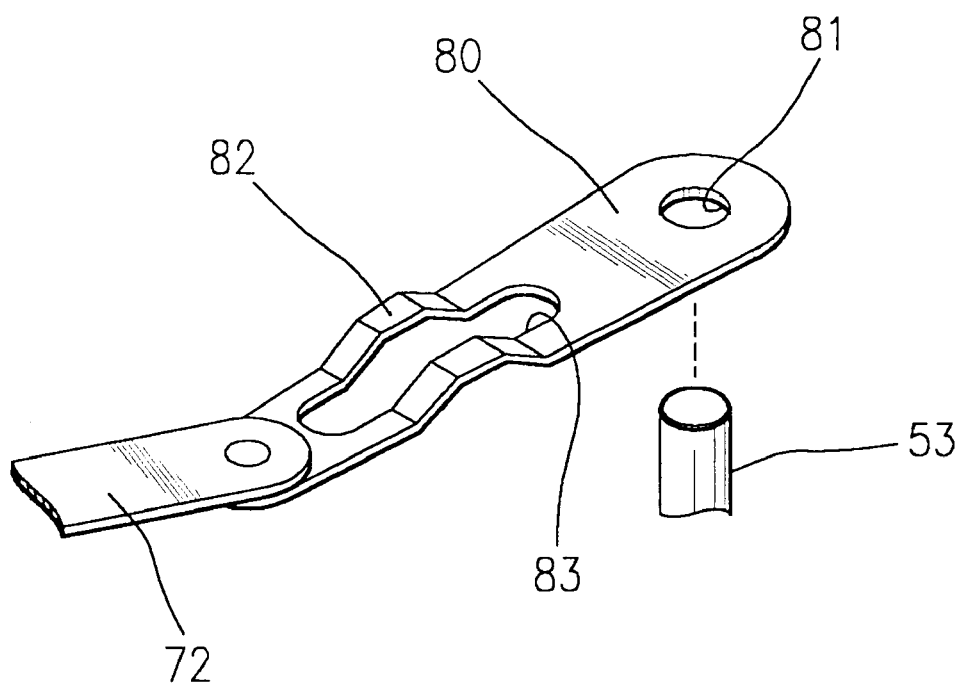
FIG. 6 depicts a view illustrating the construction of a link device in accordance with the second preferred embodiment of the present invention.

This embodiment is similar to the first one, except that a second link 80 in accordance with the second preferred embodiment of the present invention has a different construction from that of the second link 73 of the first preferred embodiment thereof. As shown in FIG. 6, the second link 80 one end of which is rotatably connected with the first link 72 has a hole 81 for accommodating the pin 53 of the pole base assembly 52 at its the other end, and a bent portion 82 serving as a resilient portion at its substantially middle part. In order to increase the resilient force of the bent portion 82, the bent portion 82 may be formed with an opening 83.

Figure 7:
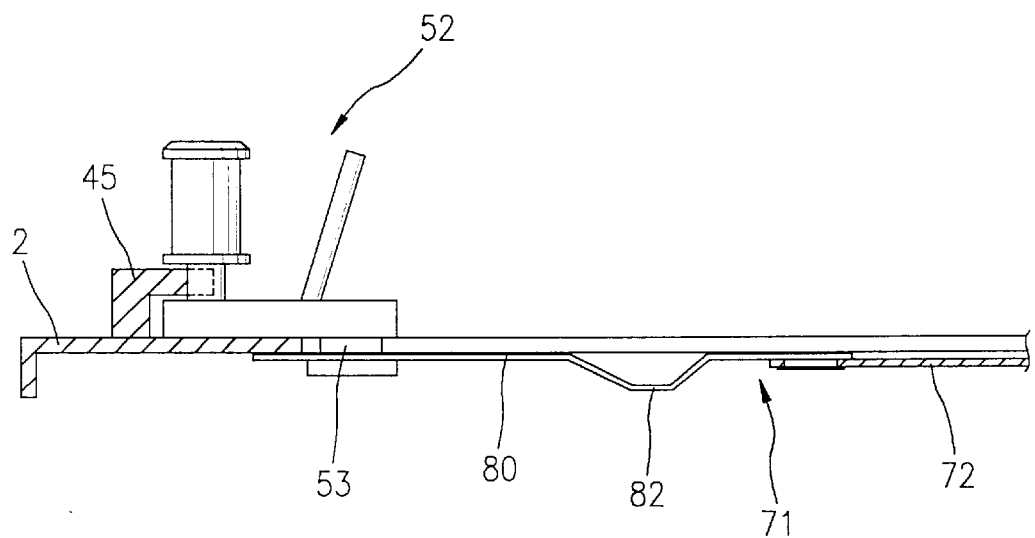
FIG. 7 displays a view showing a tape loading process using the second preferred embodiment of the present invention.
Figure 8:
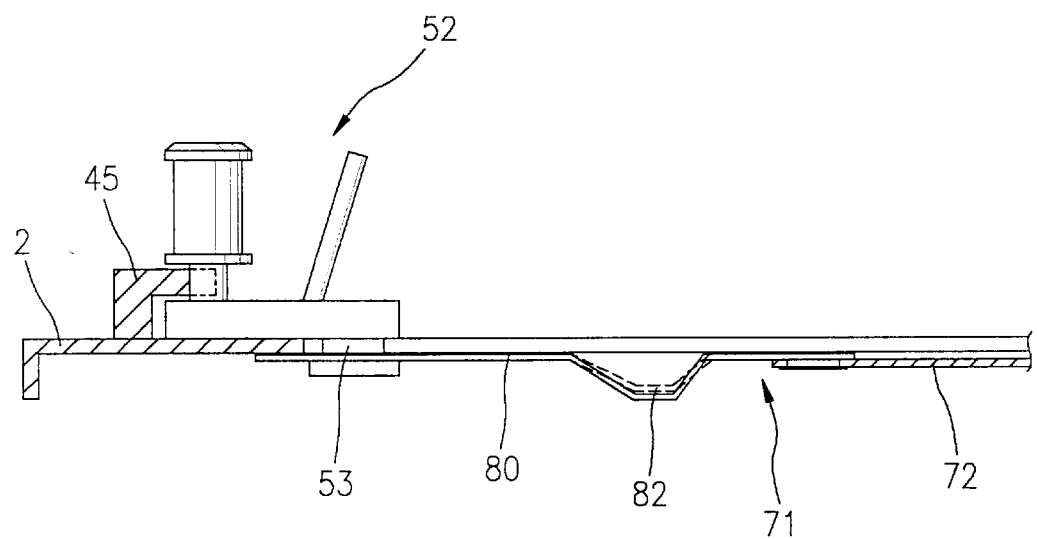
FIG. 8 provides a view showing how the link device exerts a resilient force on a loaded tape according to the second preferred embodiment of the present invention.

When the tape loading operation is performed, as shown in FIG. 7, the link device 71 is moved by the rotation of the pole base assembly loading gears 70, till the pole base assembly 52 comes into contact with the positioning block 45. As shown in FIG. 8, when the pole base assembly loading gear 70 is further rotated, the shape of the bent portion 82 of the second link 80 is elastically changed from the shape illustrated by a phantom line into the shape represented by a solid line, the changed configuration allowing it to exert the resilient force on the loaded tape, thereby preventing the tape from slackening.

Although the invention has been shown and described with respect to the preferred embodiments, it will be understood by those skilled in the art that various changes and modifications may be made without departing from the scope of the invention as defined in the following claims.

What is claimed is:

1. A tape loading apparatus including a driving unit, a pair of pole base assemblies and a power conveying unit configured to convey power from the driving unit to the pole base assemblies, the power conveying unit comprising:

a pair of link devices for transmitting power from the driving unit into its corresponding pole base assembly and allowing the pole base assemblies to load a tape, wherein a deformable bent portion forming an integral part of each of the link devices for exerting a resilient force on the tape even after a tape loading operation is completed.

* * * * *